United States Patent
Dohi

(10) Patent No.: US 9,531,925 B2
(45) Date of Patent: Dec. 27, 2016

(54) PHOTOGRAPHING APPARATUS

(75) Inventor: Hiroshi Dohi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 656 days.

(21) Appl. No.: 13/561,470

(22) Filed: Jul. 30, 2012

(65) Prior Publication Data
US 2013/0120583 A1     May 16, 2013

(30) Foreign Application Priority Data

Nov. 14, 2011   (KR) .................. 10-2011-0118509

(51) Int. Cl.
*H04N 5/225*   (2006.01)
(52) U.S. Cl.
CPC .................. *H04N 5/2254* (2013.01)

(58) Field of Classification Search
CPC ... H04N 5/23209; H04N 5/735; H04N 5/2254
USPC ............... 348/223.1, 272–280, 360–361
See application file for complete search history.

(56) References Cited

U.S. PATENT DOCUMENTS

| | | | |
|---|---|---|---|
| 6,747,704 B1* | 6/2004 | Kitamura | 348/363 |
| 2003/0160876 A1* | 8/2003 | Miyao et al. | 348/223.1 |
| 2011/0051260 A1* | 3/2011 | Nakayama et al. | 359/738 |
| 2011/0187890 A1* | 8/2011 | Takayama et al. | 348/223.1 |

* cited by examiner

*Primary Examiner* — Tuan Ho
(74) *Attorney, Agent, or Firm* — Drinker Biddle & Reath LLP

(57) ABSTRACT

A photographing apparatus includes an optical system, an imaging device that converts image light passing through the optical system into an electrical signal, and a light amount reduction filter that is disposed on a light path of the image light incident on the imaging device and reduces an amount of light having a wavelength of 450 nm to 600 nm.

11 Claims, 5 Drawing Sheets

PHOTOGRAPHING APPARATUS

CROSS-REFERENCE TO RELATED PATENT APPLICATION

This application claims the benefit of Korean Patent Application No. 10-2011-0118509, filed on Nov. 14, 2011, in the Korean Intellectual Property Office, the disclosure of which is incorporated herein in its entirety by reference.

BACKGROUND

1. Field of the Invention

Embodiments relate to a photographing apparatus, and more particularly, to a photographing apparatus that may minimize noise and may prevent a signal in a high luminance region from being clipped.

2. Description of the Related Art

Digital image capturing apparatuses, such as digital cameras, video cameras, and the like, include an imaging device. Imaging devices with improved sensitivity are widely used. Thus, when the same image is captured, image signals having relatively large signal levels may be obtained. However, since an improvement in sensitivity of imaging devices does not cause an improvement in saturation sensitivity, when ISO sensitivity is set low, a signal in a high luminance region may be clipped.

Thus, in order to prevent the signal in the high luminance region from being clipped, ISO sensitivity may be set equal to or greater than 100, which is reference sensitivity. However, since, in the case of high ISO sensitivity, a gain of minimum sensitivity needs to be set high, a signal to noise ratio (SNR) may be reduced.

SUMMARY

Embodiments provide a photographing apparatus that may minimize noise and may prevent a signal in a high luminance region from being clipped.

According to an aspect, there is provided a photographing apparatus including an optical system, an imaging device that converts image light passing through the optical system into an electrical signal, and a light amount reduction filter that is disposed on a light path of the image light incident on the imaging device and reduces an amount of light having a wavelength of 450 nm to 600 nm.

A light amount reduction ratio of the light amount reduction filter with respect to the wavelength may be greater than 0% and may be equal to or less than 30%.

The photographing apparatus may further include an infrared ray blocking filter that is disposed on the light path of the image light incident on the imaging device.

The light amount reduction filter and the infrared ray blocking filter may be integrally formed.

The imaging device may have sensitivity characteristics corresponding to red (R), green (G), and blue (B), respectively, and sensitivity corresponding to green (G) may be greater than sensitivity corresponding to red (R) and blue (B).

The photographing apparatus may further include an image processing unit that adjusts white balance of image signals by multiplying levels of image signals corresponding to red (R) and blue (B), respectively, by gain coefficients based on an image signal corresponding to green (G), wherein the imaging device generates the image signals corresponding to red (R), green (G), and blue (B), respectively.

The image processing unit may include a gamma correction processing unit that performs gamma conversion on the image signals of which white balance is adjusted, based on gamma coefficients; a luminance signal processing unit that generates a luminance signal with respect to red (R), green (G), and blue (B) from the gamma converted signals; and a chrominance signal processing unit that generates a chrominance signal with respect to red (R), green (G), and blue (B) from the gamma converted signals.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described more fully with reference to the accompanying drawings, in which exemplary embodiments are shown.

Figure 1:
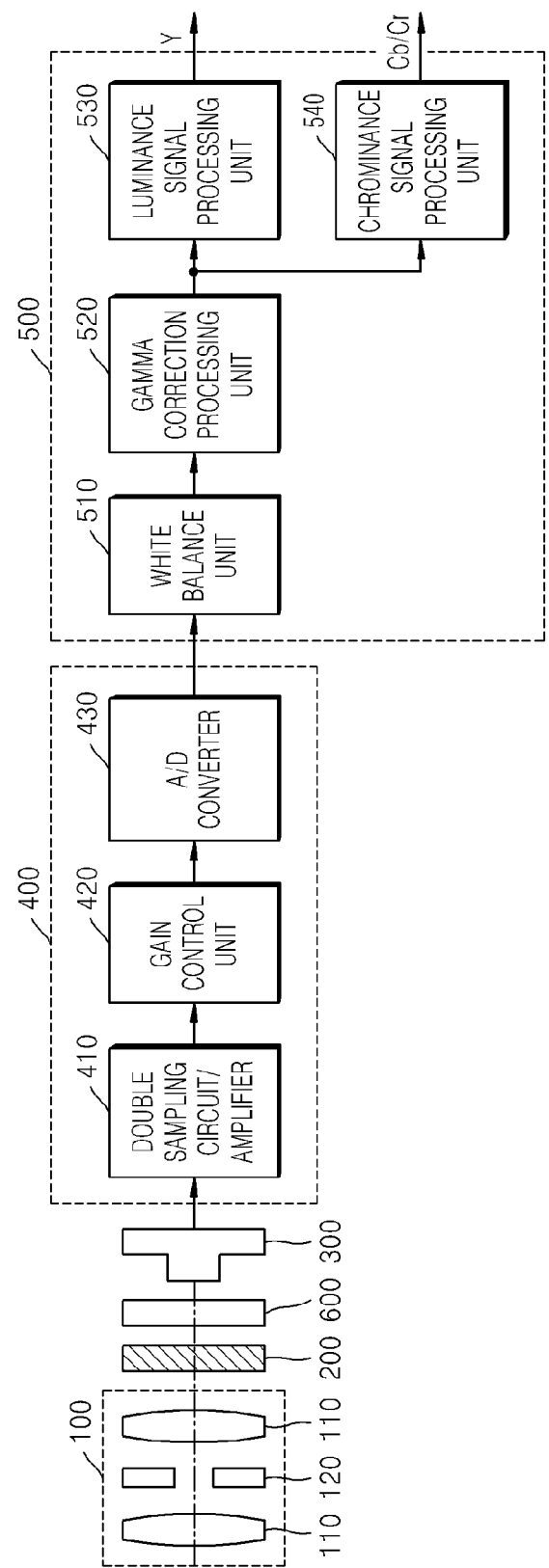
FIG. 1 is a block diagram illustrating a relationship between elements of a photographing apparatus according to an embodiment.

FIG. 1 is a block diagram illustrating a relationship between elements of a photographing apparatus according to an embodiment.

Referring to FIG. 1, the photographing apparatus can include an optical system 100, an imaging device 300 that can convert image light that passes through the optical system 100 into an electrical signal, and a light amount reduction filter 200 that can be disposed on a light path of the image light that is incident on the imaging device 300 and can reduce the amount of light having a wavelength of 450 nm to 600 nm.

The optical system 100 can include a plurality of lenses 110 and can form an image from external image light on an image-forming surface of the imaging device 300. The plurality of lenses 110 may include a zoom lens that can enlarge or reduce a size of a subject and a focusing lens that can adjust a focus of the subject. The lenses 110 can be disposed so that distances between the lenses 110 vary. When the distances between the lenses 110 vary, a zooming rate, a focus, and the like of the optical system 100 can be adjusted.

An iris diaphragm 120 can adjust the amount of light that is incident on the imaging device 300 when an image is captured. The photographing apparatus may include a shutter (not shown) that can control light that enters the imaging device 300.

The imaging device 300 can convert image light that is incident on the imaging device 300 through the optical system 100 into an electrical signal. The imaging device 300 can include a photoelectric conversion element, such as a charge-coupled device (CCD) or a complementary metal oxide semiconductor (CMOS). The imaging device 300 can split the incident light into three primary colors, such as red (R), green (G), and blue (B), and can output image signals which can correspond to R, G, and B colors, respectively.

The light amount reduction filter 200 that can reduce the amount of light having a wavelength of 450 nm to 600 nm can be disposed on the light path of the image light that is incident on the imaging device 300. Since the image light that is incident on the imaging device 300 through the optical system 100 passes through the light amount reduction filter 200 before the image light is incident on the imaging device 300, the amount of light having a wavelength of 450 nm to 600 nm, i.e., which corresponds to green (G), can be reduced by the light amount reduction filter 200. In the current embodiment, the light amount reduction filter 200 can be disposed between the optical system 100 and the imaging device 300. However, embodiments are not limited thereto, and the light amount reduction filter 200 may be included in the optical system 100 or may also be disposed in front of the optical system 100 towards a subject.

An infrared ray blocking filter 600 that can block infrared rays may be further disposed in front of the imaging device 300 towards the subject. That is, the infrared ray blocking filter 600 can be disposed on the light path of the image light that is incident on the imaging device 300 and can block or reduce infrared ray components of the light that is incident on the imaging device 300.

In the current embodiment, the light amount reduction filter 200 and the infrared ray blocking filter 600 can be disposed separate from each other. However, embodiments are not limited thereto, and the light amount reduction filter 200 and the infrared ray blocking filter 600 may be integrally formed. That is, a filter having a characteristic of transmitting light having a wavelength of 450 nm to 600 nm can be disposed or additionally coated on the infrared ray blocking filter 600 so that the light amount reduction filter 200 and the infrared ray blocking filter 600 may be implemented as a single filter.

Generally, sensitivity with respect to green (G) that can be directly related to resolution and can be close to a luminance signal of human eyes may be greater than sensitivity with respect to another color, such as red (R) or blue (B). The imaging device 300 can include a combination of a plurality of filters that can allow only predetermined color of light to transmit through the filters. In the current embodiment, the filters can include R, G, and B filters. However, embodiments are not limited thereto, and the imaging device 300 may include a combination of color filters in which R, G1, G2, and B filters can be arranged in a 2×2 matrix form, or may further include yellow (Y), cyan (C) filter, and the like, or may include a combination of color filters in which the color filters are arranged in a 4×4 matrix form.

The photographing apparatus according to the current embodiment can further include a front end unit 400 that can convert an analog electrical signal output from the imaging device 300 into a digital signal, and an image processing unit 500 that can form a luminance signal and a chrominance signal from the output digital signal.

The image signals, which can be outputted from the imaging device 300 and correspond to R, G, and B colors, respectively, can be inputted to the front end unit 400 that can process an analog electrical signal. The front end unit 400 can include a correlation double sampling circuit/amplifier 410 that can remove low frequency noise included in image signals and can simultaneously amplify an electrical signal to a predetermined level, a gain control unit 420 that can adjust a magnitude of a signal to an appropriate level, and an analog to digital (A/D) converter 430 that can convert an analog signal into a digital signal.

The digital signal output from the front end unit 400 can be inputted to the image processing unit 500. The image processing unit 500 can include a white balance unit 510, a gamma correction processing unit 520, a luminance signal processing unit 530, and a chrominance signal processing unit 540. The white balance unit 510 can correct a difference in chrominance signal levels caused by a difference in color temperature environment of the subject and a sensitivity difference of color filters of the imaging device 300. In this regard, R, G, and B signal levels can be adjusted to be the same by multiplying red (R) and blue (B) signal levels by appropriate gain coefficients based on a green (G) signal level. The gain coefficient multiplied by the red (R) signal level and the gain coefficient multiplied by the blue (B) signal level may be different from each other. The gain coefficient multiplied by the red (R) signal level may be a ratio of the red (R) signal level with respect to the green (G) signal level (G signal level/R signal level), and the gain coefficient multiplied by the blue (B) signal level may be a ratio of the blue (B) signal level with respect to the green (G) signal level (G signal level/B signal level).

The gamma correction processing unit 520 can perform gamma conversion on the R, G, and B signals outputted from the white balance unit 510 based on a gamma coefficient. The gamma correction processing unit 520 can transmit the gamma-corrected R, G, and B signals to the luminance signal processing unit 530 and the chrominance signal processing unit 540. The luminance signal processing unit 530 can generate a luminance signal Y by synthesizing the gamma-corrected R, G, and B signals at a predetermined synthesis ratio, and the chrominance signal processing unit 540 can generate chrominance signals Cb and Cr by synthesizing the gamma-corrected R, G, and B signals at a predetermined synthesis ratio.

Figures 2A, 2B, 2C:
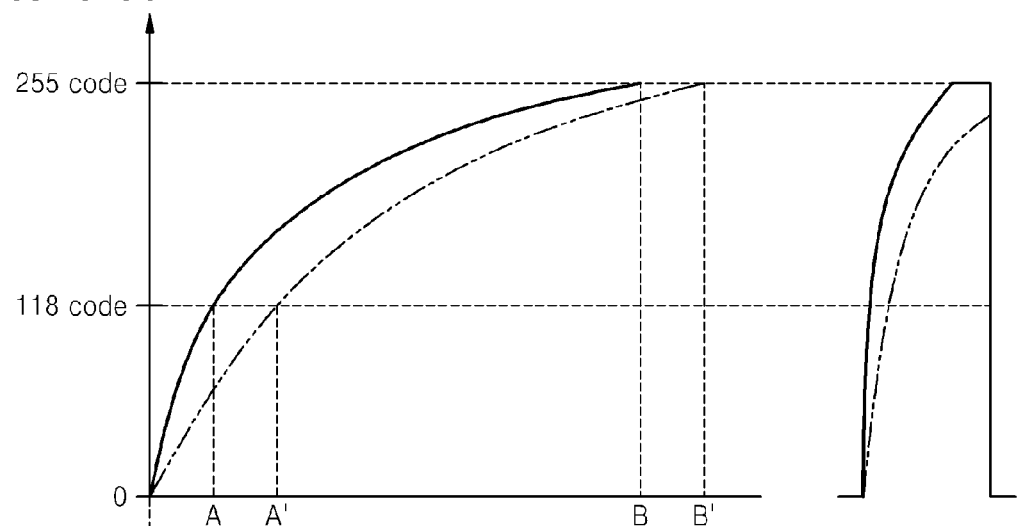
FIGS. 2A, 2B, and 2C are graphs showing an input/output signal (solid line) of a gamma correction processing unit of the photographing apparatus illustrated in FIG. 1 and a comparative example (short-short-long dashed line)

FIGS. 2A, 2B, and 2C are graphs showing an input/output signal (solid line) of a gamma correction processing unit of the photographing apparatus illustrated in FIG. 1 and a comparative example (short-short-long dashed line).

FIG. 2A is a graph showing gamma gray scale conversion characteristics. FIG. 2B is a graph showing signals inputted to the gamma correction processing unit 520. FIG. 2C is a graph showing signals outputted from the gamma correction processing unit 520. The horizontal axis of the graphs of FIGS. 2A and 2B represents input signal levels, and the vertical axis of the graphs of FIGS. 2B and 2C represents output signal levels marked by digital values.

When an input signal level corresponding to a 118 code that is a base for determining ISO sensitivity is A and an input signal level corresponding to a 255 code that is the maximum output level that may be processed by the gamma correction processing unit 520 is B, a dynamic range can be a ratio of values 0 to B with respect to values 0 to A. The dynamic range can be a significant factor in determining gray scale characteristics of an image. When the dynamic range is too small, luminance can be saturated in a high luminance region, and an image can appear white. When the dynamic range is too large, a gain in a low luminance region can increase, and noise can increase. The dynamic range may be generally set to 8 to 10 times.

Referring to FIG. 2B, a value corresponding to the input signal level B can be an input signal value corresponding to a case where a top surface exposure value Hm of the imaging device 300 can be 1, and a value corresponding to the input signal level A can be an input signal value corresponding to the top surface exposure value Hm of the imaging device 300 that can be determined by the set ISO sensitivity. In detail, the ISO sensitivity can represent a sensitivity level that can ensure an appropriate signal level in a predetermined exposure condition and can be defined by ISO=10/Hm. Hm can represent top surface exposure of the imaging device 300 and can be defined as Hm=0.65×B×T/F$^2$. Here, B can be brightness of the subject (Cd/m$^2$); T can be shutter speed s; and F can represent a focal length m of a lens.

For example, when the ISO sensitivity is set to 100, Hm can be 0.1, and the input signal level A in FIG. 2B can be an input signal value corresponding to a case where Hm is 0.1. The value Hm may vary according to the set ISO sensitivity. An input signal level C can be a saturated input signal value corresponding to the number of saturation electrons of the imaging device 300.

As sensitivity of the imaging device 300 has increased recently, the number of sensitivity electrons corresponding to a case where a value corresponding to B, i.e., Hm is 1, has increased. However, an increase in the number of sensitivity electrons may not accompany an increase in the number of saturation electrons of the imaging device 300. As in a comparative example of FIG. 2A, marked by a short-short-long dashed line, when the ISO sensitivity is 100, sensitivity of the imaging device 300 can increase, and an input signal value corresponding to a case where Hm is 0.1 can be A', and an input signal value corresponding to a case where Hm is 1 can be B'. However, the input signal value corresponding to the number of saturation electrons may not increase and can be maintained at C. Thus, B' can be greater than C, and as shown in FIG. 2C by a short-short-long dashed line, an output signal corresponding to an input signal value that is greater than C and is less than B', i.e., an output signal in a high luminance region can be clipped.

In order to solve this problem, the saturation input signal value C may be greater than B' by setting the ISO sensitivity to be high and by decreasing the value Hm. However, in this case, since the gain of minimum sensitivity has to be greatly adjusted, a signal to noise ratio (S/N ratio) can be reduced.

Thus, in the current embodiment, the light amount reduction filter 200 that can reduce the amount of light having a wavelength of 450 nm to 600 nm, i.e., corresponding to green (G), can be disposed in front of the imaging device 300 toward the subject. Since the imaging device 300 can have sensitivity with respect to green (G) that is greater than red (R) or blue (B), a magnitude of an output signal corresponding to green (G) can be greater than a magnitude of an output signal corresponding to red (R) or blue (B). Thus, when only the output signal corresponding to green (G) is reduced and gains of output signals corresponding to red (R) and blue (B) are adjusted by the white balance unit 510, noise may be minimized, and A' shown in FIG. 2B may be reduced to A. Thus, the input signal value corresponding to the case where Hm is 1 can also be reduced from B' to B. Since B is smaller than C, the output signal in a high luminance region may be prevented from being clipped. However, in order to prevent a phenomenon in which the output signal is saturated in the high luminance region and appears as white, the dynamic range may be adjusted so that B and C are the same as each other.

There is another method of reducing A' to A and B' to B as well as a method of disposing the light amount reduction filter 200 that can reduce the amount of light corresponding to green (G). That is, there is a method of additionally disposing a neutral density (ND) filter or the like so as to reduce the amount of light that is incident on the imaging device 300. However, in this case, noise can be increased compared to a case where only the amount of light corresponding to green (G) is reduced. This will be described below.

Figure 3:
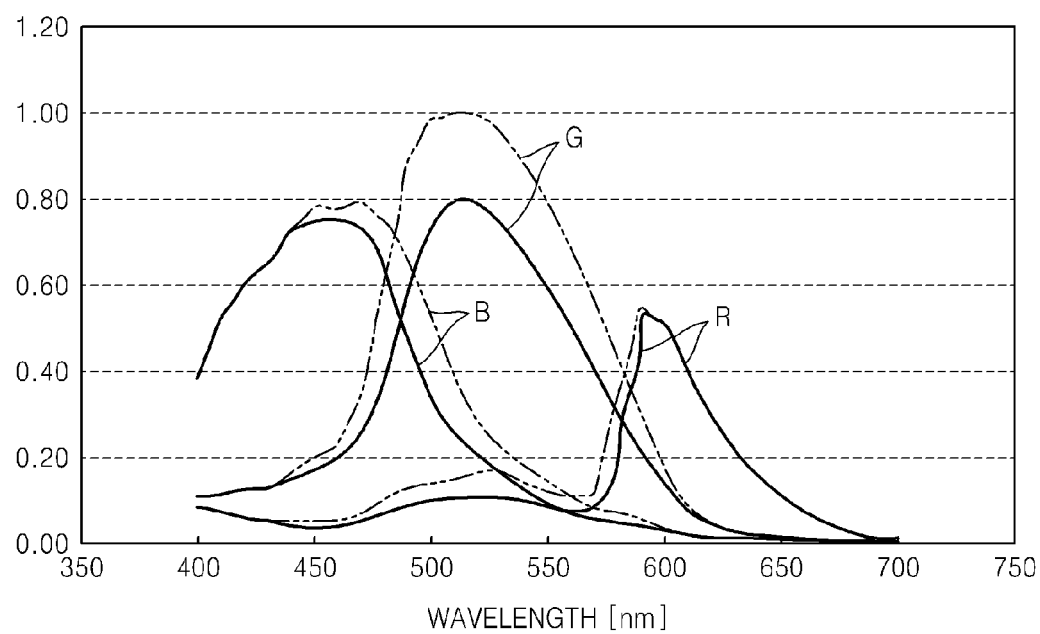
FIG. 3 is a graph showing an output signal (solid line) of an imaging device of the photographing apparatus including a light amount reduction filter illustrated in FIG. 1 and an output signal (short-short-long dashed line) of an imaging device when a photographing apparatus does not include a light amount reduction filter according to a comparative example (short-short-long dashed line), respectively.

FIG. 3 is a graph showing an output signal (solid line) of the imaging device 300 of the photographing apparatus including the light amount reduction filter 200 illustrated in FIG. 1 and an output signal (short-short-long dashed line) of an imaging device when a photographing apparatus does not include a light amount reduction filter according to a comparative example (short-short-long dashed line), respectively.

Referring to FIG. 3, the imaging device 300 can convert image light that is incident on the imaging device 300 into an electrical signal and can output image signals corresponding to red (R), green (G), and blue (B), respectively. In the comparative example indicated by a short-short-long dashed line, the imaging device 300 can have sensitivity with respect to green (G) that is directly related to resolution and can be close to a luminance signal of human eyes and can be greater than sensitivity with another color, such as red (R) or blue (B). Thus, the maximum value of the image signal corresponding to green (G) can be greater than other colors.

The image signals output from the imaging device 300 can be converted into digital signals by the front end unit 400 and can be adjusted by the white balance unit 510 so that magnitudes of the image signals can be the same by multiplying red (R) and blue (B) signal levels by appropriate gain coefficients based on a green (G) signal level. The signals outputted from the white balance unit 510 can be inputted to the gamma correction processing unit 520. In this case, when the magnitude of the green (G) signal is too large, the green (G) signal can be clipped.

However, the photographing apparatus according to the current embodiment can include the light amount reduction filter 200 that can be disposed in front of the imaging device 300 toward the subject. As indicated by a solid line, when the photographing apparatus includes the light amount reduction filter 200, the magnitude of the image signal having a wavelength of 450 nm to 600 nm among the image signals outputted from the imaging device 300 can be reduced compared to the comparative example (short-short-long dashed line). The image signal having a wavelength of 450 nm to 600 nm can correspond to green (G).

The image signals outputted from the imaging device 300 can be converted into digital signals by the front end unit 400 and can be adjusted by the white balance unit 510 so that magnitudes of the image signals can be the same by multiplying red (R) and blue (B) signal levels by appropriate gain coefficients based on a green (G) signal level. In this case, since the magnitude of the green (G) signal can be reduced compared to the comparative example, the gain coefficients applied to red (R) and blue (B) can be reduced, and magnitudes of the image signals corresponding to red (R), green (G), and blue (B) can be reduced compared to a modified example. Thus, as illustrated in FIGS. 2A, 2B, and 2C, a signal in a high luminance region may be prevented from being clipped by the gamma correction processing unit 520.

In this regard, comparing the case where the photographing apparatus includes the light amount reduction filter 200 that can reduce the amount of light having a wavelength of 450 nm to 600 nm with the case where the photographing apparatus includes an ND filter that can reduce the amount of light in all wavelength regions, since, in both cases, gains of the signals can be adjusted based on the green (G), the magnitudes of the signals inputted to the gamma correction processing unit 520 can be the same when light amount reduction ratios of the light amount reduction filter 200 with respect to all wavelength regions are controlled to be the same. However, there can be a difference between S/N ratios in both cases.

The luminance signal processing unit 530 can generate a luminance signal Y by synthesizing gamma-corrected R, G, and B signals at a predetermined synthesis ratio, and the chrominance signal processing unit 540 can generate chrominance signals Cb and Cr by synthesizing the gamma-corrected R, G, and B signals at a predetermined synthesis ratio. In this case, when the amount of light in all wavelength regions is reduced by 20% by using the ND filter, the luminance signal and the chrominance signal can be simply defined as 20 log(1−0.2)=−1.9 dB and thus, the S/N ratio can be reduced.

When the amount of light corresponding to red (R), green (G), and blue (B), respectively, is not reduced, the luminance signal can be defined as Y=0.3×R+0.59×G+0.11×B. In the case of achromatic color, R=G=B=1, and thus Y=1. Here, R, G, and B can represent magnitudes of signals corresponding to red (R), green (G), and blue (B), respectively, and 0.3, 0.59, and 0.11 can represent weights applied to red (R), green (G), and blue (B), respectively, when the luminance signal is generated.

When only the amount of light corresponding to green (G) is reduced by 20%, Y=0.3×R+0.59×(0.8×G)+0.11×B. Thus, when R=G=B=1, Y=0.88. Since the signals corresponding to red (R), green (G), and blue (B), respectively, can be compensated for by multiplying the signal levels by gain coefficients corresponding to the magnitude of which luminance signal is reduced, in this case, the S/N ratio can be defined as 20 log(0.88)=−1.1 dB. Thus, although the S/N ratio can be reduced, the S/N ratio can be increased to 0.8 dB when the amount of light in all wavelength regions is reduced by the ND filter.

In the case of the chrominance signal, since the level of the signal corresponding to green (G) can be reduced by 20%, gain coefficients to be multiplied with the signal levels corresponding to red (R) and blue (B) required for adjusting white balance can be reduced by 20%. Thus, noise included in a chrominance signal of the red (R) and blue (B) can be reduced by 20 log(1−0.2)=−1.9 dB. That is, the S/N ratio can be increased by 1.9 dB, and the S/N ratio corresponding to a value that is obtained by multiplying the signal levels by gain coefficients corresponding to the magnitude of which luminance is reduced can be summed to −1.1 dB. Also, the overall S/N ratio can be increased by 1.9 dB−1.1 dB=0.8 dB.

Figure 4:
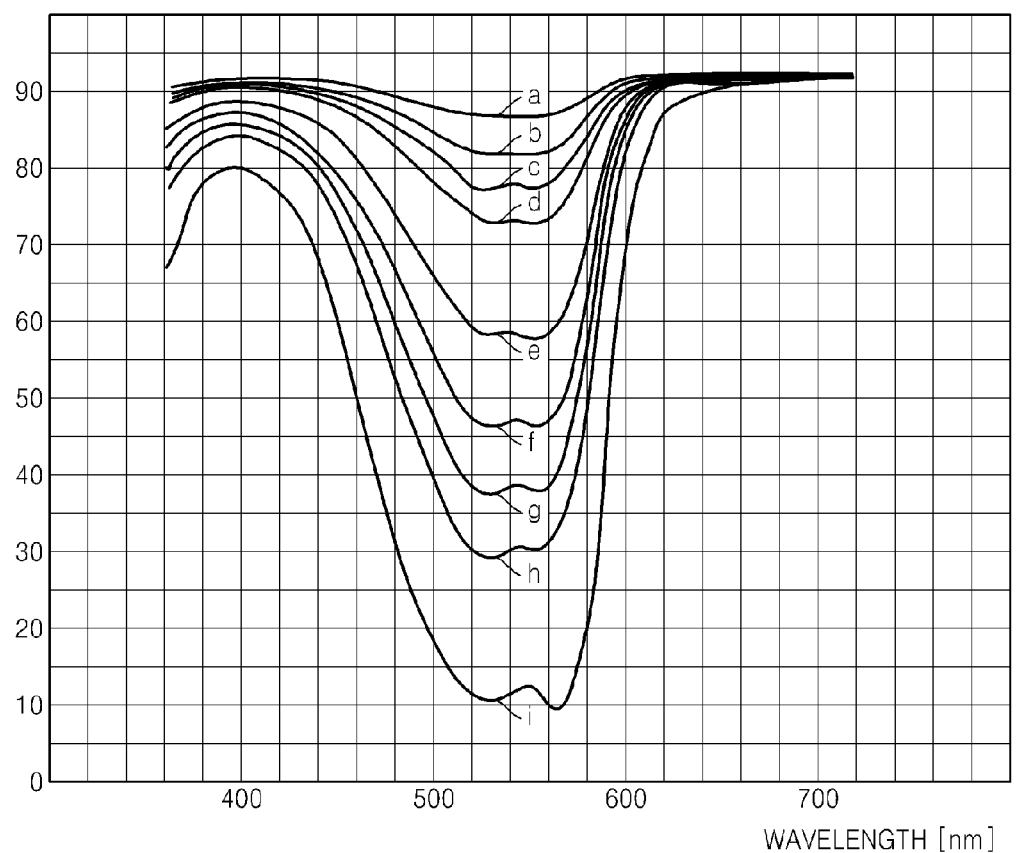
FIG. 4 is a graph showing transmittance of a plurality of light amount reduction filters.

FIG. 4 is a graph showing transmittance of a plurality of light amount reduction filters. In detail, FIG. 4 illustrates transmittance of each of a plurality of light amount reduction filters that can reduce the amount of light having a wavelength of 450 nm to 600 nm. The plurality of light amount reduction filters usually reduce transmittance of light corresponding to green (G), and a degree of reducing transmittance of light may vary in each filter.

In the current embodiment, light amount reduction ratios of the light amount reduction filter 200 with respect to the wavelength may be equal to or less than 30%. Thus, a of FIG. 4 represents a very small light amount reduction ratio so that the effect of reducing the amount of light corresponding to green (G) is very small, and e, f, g, h, and i of FIG. 4 represent very large light amount reduction ratios so that the amount of transmitted light corresponding to green (G) may be very small. Thus, filters marked by b, c, and d may be used.

Figure 5:
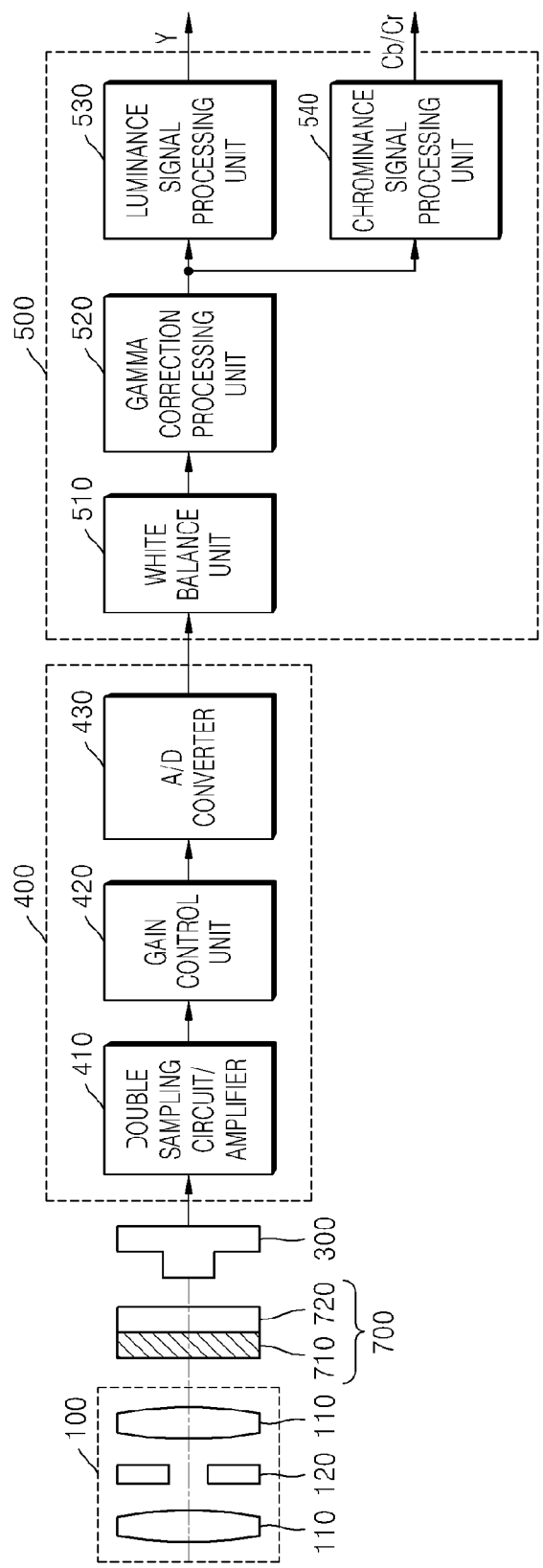
FIG. 5 is a block diagram illustrating a relationship between elements of a photographing apparatus according to another embodiment.

FIG. 5 is a block diagram illustrating a relationship between elements of a photographing apparatus according to another embodiment.

Referring to FIG. 5, the only difference between FIGS. 1 and 5 is that the photographing apparatus illustrated in FIG. 5 can include one filter 700 including a light amount reduction filter 710 and an infrared ray blocking filter 720. In this case, a layer having characteristics that the amount of light having a wavelength of 450 nm to 600 nm can be reduced may be deposited on the infrared ray blocking filter 720 or attached to the infrared ray blocking filter 720 so that the same effect as FIG. 1 may be achieved. This case can be appropriate for reducing the size of the photographing apparatus.

As described above, a light amount reduction filter can be additionally installed so that noise may be reduced and a signal in a high luminance region may be prevented from being clipped.

The apparatus described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer-readable codes executable by the processor on a non-transitory computer-readable media such as read-only memory (ROM), random-access memory (RAM), CD-ROMs, DVDs, magnetic tapes, hard disks, floppy disks, and optical data storage devices. The computer-readable recording medium can also be distributed over network-coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the exemplary embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembly language, or the like, with the various algorithms being implemented with any combination of data structures, objects, processes, routines or other programming elements. Also, using the disclosure herein, programmers of ordinary skill in the art to which the invention pertains can easily implement functional programs, codes, and code segments for making and using the invention. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines or connectors shown in the various figures presented are intended to represent exemplary functional relationships and/or physical or logical connections between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will also be recognized that the terms "comprises," "comprising," "includes," "including," "has," and "having," as used herein, are specifically intended to be read as open-ended terms of art. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention. Therefore, the scope of the invention is defined not by the detailed description of the invention but by the following claims, and all differences within the scope will be construed as being included in the invention.

What is claimed is:
1. A photographing apparatus comprising:
an optical system;
an imaging device that converts image light passing through the optical system into an electrical signal;
a light amount reduction filter that is disposed on a light path of the image light incident on the imaging device and reduces an amount of light corresponding to green having a wavelength of 450 nm to 600 nm relative to light corresponding to red having a wavelength greater than 600 nm and light corresponding to blue having a wavelength less than 450 nm, the image light including each of the light corresponding to green, the light corresponding to red, and the light corresponding to blue that pass through the same light amount reduction filter; and
an image processing unit that generates a luminance signal Y according to:

$$Y=\alpha \cdot R+\beta \cdot ((1-\Delta)\cdot G)+\gamma \cdot B$$

where $\alpha$ is the red white balance weight, $\beta$ is the green white balance weight, $\gamma$ is the blue white balance weight, R is a magnitude of an image signal corresponding to red, G is a magnitude of an image signal corresponding to green, B is a magnitude of an image signal corresponding to blue, $\Delta$ is a light amount reduction ratio of the light amount reduction filter with respect to the wavelength of 450 nm to 600 nm, and the imaging device generates the image signals corresponding to red (R), green (G), and blue (B).

2. The photographing apparatus of claim 1, wherein $\alpha=0.3$, $\beta=0.59$, and $\gamma=0.11$.

3. A photographing apparatus comprising:
an optical system;
an imaging device that converts image light passing through the optical system into an electrical signal;
a light amount reduction filter that is disposed on a light path of the image light incident on the imaging device and reduces an amount of light corresponding to green having a wavelength of 450 nm to 600 nm relative to light corresponding to red having a wavelength greater than 600 nm and light corresponding to blue having a wavelength less than 450 nm, the image light including each of the light corresponding to green, the light corresponding to red, and the light corresponding to blue that pass through the same light amount reduction filter; and
an image processing unit that generates chrominance signals Cb and Cr by synthesizing gamma-corrected image signals corresponding to red (R), green (G), and blue (B) at a synthesis ratio that reduces gain coefficients to be multiplied with a magnitude of the image signal corresponding to red and a magnitude of the image signal corresponding to blue by $\Delta$, where $\Delta$ is a light amount reduction ratio of the light amount reduction filter with respect to the wavelength of 450 nm to 600 nm, and the imaging device generates the image signals corresponding to red (R), green (G), and blue (B).

4. The photographing apparatus of claim 1, wherein a light amount reduction ratio of the light amount reduction filter with respect to the wavelength of 450 nm to 600 nm is greater than 0% and is equal to or less than 30%.

5. The photographing apparatus of claim 1, further comprising an infrared ray blocking filter that is disposed on the light path of the image light incident on the imaging device.

6. The photographing apparatus of claim 1, wherein the image processing unit comprises
a gamma correction processing unit that performs gamma conversion on the image signals of which white balance is adjusted, based on gamma coefficients, a luminance signal processing unit that generates a luminance signal with respect to red (R), green (G), and blue (B) from the gamma converted signals, and a chrominance signal processing unit that generates a chrominance signal with respect to red (R), green (G), and blue (B) from the gamma converted signals.

7. The photographing apparatus of claim 1, wherein the luminance signal Y in a high luminance region is prevented from being clipped.

8. The photographing apparatus of claim 3, wherein a light amount reduction ratio of the light amount reduction filter with respect to the wavelength of 450 nm to 600 nm is greater than 0% and is equal to or less than 30%.

9. The photographing apparatus of claim 3, further comprising an infrared ray blocking filter that is disposed on the light path of the image light incident on the imaging device.

10. The photographing apparatus of claim 3, wherein the image processing unit comprises a gamma correction processing unit that performs gamma conversion on the image signals of which white balance is adjusted, based on gamma coefficients, a luminance signal processing unit that generates a luminance signal with respect to red (R), green (G), and blue (B) from the gamma converted signals, and a chrominance signal processing unit that generates a chrominance signal with respect to red (R), green (G), and blue (B) from the gamma converted signals.

11. The photographing apparatus of claim 3, wherein noise in the chrominance signals Cb and Cr is reduced.

* * * * *